US010427650B2

(12) United States Patent
Salter et al.

(10) Patent No.: US 10,427,650 B2
(45) Date of Patent: Oct. 1, 2019

(54) SELF-CLEANING SYSTEM FOR INTERIOR OF A MOTOR VEHICLE

(71) Applicant: FORD GLOBAL TECHNOLOGIES, LLC, Dearborn, MI (US)

(72) Inventors: Stuart C. Salter, White Lake, MI (US); Paul Kenneth Dellock, Northville, MI (US); James J. Surman, Clinton Township, MI (US); Chester Stanislaus Walawender, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 245 days.

(21) Appl. No.: 15/434,654

(22) Filed: Feb. 16, 2017

(65) Prior Publication Data

US 2018/0229694 A1 Aug. 16, 2018

(51) Int. Cl.
| | |
|---|---|
| *B60S 1/64* | (2006.01) |
| *B60J 7/057* | (2006.01) |
| *B60J 3/04* | (2006.01) |
| *B32B 17/06* | (2006.01) |
| *B32B 3/26* | (2006.01) |
| *B32B 1/08* | (2006.01) |
| *B32B 27/34* | (2006.01) |
| *B08B 7/00* | (2006.01) |
| *B60J 7/043* | (2006.01) |
| *B60J 7/00* | (2006.01) |

(52) U.S. Cl.
CPC .............. *B60S 1/64* (2013.01); *B08B 7/0035* (2013.01); *B60J 7/0007* (2013.01); *B60J 7/043* (2013.01); *B60J 7/057* (2013.01)

(58) Field of Classification Search
CPC ..... B60S 1/64; G01F 1/13; B60J 7/057; B60J 3/04; B32B 17/06; B32B 3/26; B32B 1/08; B32B 27/34; G08G 77/14
See application file for complete search history.

(56) References Cited

U.S. PATENT DOCUMENTS 4,688,895 A * 8/1987 Jacob .................... B60J 3/04
349/116
7,063,379 B2 * 6/2006 Steuer ................. B60R 13/0212
296/223

(Continued)

FOREIGN PATENT DOCUMENTS

| CN | 102582401 A | 7/2012 |
| CN | 103465841 B | 8/2016 |

(Continued)

OTHER PUBLICATIONS

English Machine Translation of CN102582401A.

(Continued)

*Primary Examiner* — Yuri Kan
(74) *Attorney, Agent, or Firm* — Jason Rogers; Vichit Chea; King & Schickli, PLLC (57) ABSTRACT

A self-cleaning system is provided for the interior of a motor vehicle. That self-cleaning system includes a photoactive self-cleaning surface, a sun shade, an actuator displacing the sun shade between an opened position and a closed position and a controller. A related method of self-cleaning a surface in a passenger compartment of a motor vehicle is also disclosed.

20 Claims, 6 Drawing Sheets

(56) References Cited

U.S. PATENT DOCUMENTS

| | | | | |
|---|---|---|---|---|
| 7,510,763 | B2* | 3/2009 | Gueneau | B01J 21/063 106/2 |
| 2007/0092734 | A1* | 4/2007 | Durandeau | C23C 16/405 428/432 |
| 2008/0300359 | A1* | 12/2008 | Hoshi | C08F 220/38 524/588 |
| 2009/0239051 | A1* | 9/2009 | Fukuda | C08L 101/00 428/220 |
| 2011/0287203 | A1* | 11/2011 | Victor | B29C 37/0053 428/36.9 |

FOREIGN PATENT DOCUMENTS

| | | |
|---|---|---|
| DE | 19543508 C1 | 10/1996 |
| JP | 2000203255 A | 7/2000 |
| JP | 2002178745 A | 6/2002 |
| KR | 2012014444 A | 2/2012 |
| KR | 1516477 B1 | 5/2015 |

OTHER PUBLICATIONS

English Machine Translation of CN103465841B.
English Machine Translation of DE19543508C1.
English Machine Translation of JP2000203255A.
English Machine Translation of JP2002178745A.
English Machine Translation of KR1516477B1.
English Machine Translation of KR2012014444A.

* cited by examiner

SELF-CLEANING SYSTEM FOR INTERIOR OF A MOTOR VEHICLE

TECHNICAL FIELD

This document relates generally to the motor vehicle equipment field and, more particularly, to a self-cleaning system for the interior of a motor vehicle as well as to a method of self-cleaning a surface in a passenger compartment of a motor vehicle.

BACKGROUND

The self-cleaning effect of photoactive cleaning agents such as titanium dioxide ($TiO_2$) are known and well documented. Significantly, the desired cleaning effect may be activated with light barely in the UVA range.

More specifically, when UV shines on a photoactive self-cleaning surface incorporating titanium dioxide, electrons are released at the surface. These electrons interact with water molecules in the air separating them into hydroxyl radicals which are highly reactive, short-lived, uncharged forms of hydroxide ions. These hydroxyl radicals then attack organic (carbon-based) pollutant molecules, such as oils and other contaminants, breaking apart their chemical bonds and turning them into harmless substances such as carbon dioxide and water. Significantly, the titanium dioxide also has a similar effect on pathogen germs and mold. Advantageously, these extremely strong oxidizers are formed at or within the surface of the photoactive cleaning agent containing coating in the presence of any UV light source.

This document relates to an "intelligent" self-cleaning system for the interior of a motor vehicle. While useful in any motor vehicle, the self-cleaning system is a particularly desirable feature for autonomous shared vehicles as the increased sanitation of the interior should reduce the possibility of sickness and infection being passed from the various individuals utilizing the motor vehicle.

SUMMARY

In accordance with the purposes and benefits described herein, a self-cleaning system is provided for the interior of a motor vehicle. That self-cleaning system comprises a photoactive self-cleaning surface within the interior of the motor vehicle, a sun shade, a sun shade actuator displacing the sun shade between a first opened position and a first closed position and a controller. That controller is configured to open the sun shade when sunlight is directed so as to impinge upon the photoactive self-cleaning surface and promote cleaning.

The controller may be configured to respond to sun load data. The controller may be configured to respond to geolocator data for the motor vehicle. The controller may be configured to respond to motor vehicle occupancy data. The controller may be configured to respond to time data including date and time of day.

The self-cleaning system may further include a moon roof and a moon roof actuator for displacing the moon roof between a second opened position and a second closed position. In such an embodiment, the controller may also be configured to respond to internal temperature data. The controller may be configured to respond to ambient temperature data. The controller may be configured to respond to current precipitation data.

The photoactive self-cleaning surface may be selected from a group of surfaces consisting of a seat surface, a trim panel surface, a console surface, a steering wheel surface, a shifter surface, a switch gear surface, an instrument panel surface, a dashboard surface, a seatbelt assembly surface, a flooring surface, a molded plastic surface and combinations thereof. The photoactive self-cleaning surface may include titanium dioxide. Further, the controller may be configured with a timer function.

In accordance with an additional aspect, a method is provided of self-cleaning a surface in a passenger compartment of a motor vehicle. That method comprises the steps of providing a photoactive self-cleaning agent on the surface and opening, by a controller, a sun shade of the motor vehicle to allow sunlight to impinge upon, activate the photoactive self-cleaning agent and thereby clean that surface.

The method may further include configuring the controller to respond to geolocator data. Further, the method may include configuring the controller to respond to sun load data. The method may include configuring the controller to respond to motor vehicle occupancy data. The method may include configuring the controller to respond to time data.

The method may include configuring the controller to include a timer and closing, by the controller, the sun shade after a predetermined period of time. Still further, the method may include opening and closing a moon roof of the motor vehicle, by the controller, in response to passenger compartment temperature data and ambient temperature data. Still further, the method may include closing the moon roof, by the controller, in response to current precipitation data.

In the following description, there are shown and described several preferred embodiments of the self-cleaning system and related method of self-cleaning a surface in a passenger compartment of a motor vehicle. As it should be realized, the self-cleaning system and related method are capable of other, different embodiments and their several details are capable of modification in various, obvious aspects all without departing from the self-cleaning system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the self-cleaning system and related method and together with the description serve to explain certain principles thereof.

Reference will now be made in detail to the present preferred embodiments of the self-cleaning system and method, examples of which are illustrated in the accompanying drawing figures.

DETAILED DESCRIPTION

Reference is now made to FIGS. 1, 1a, 2 and 3 illustrating the self-cleaning system 10 for the interior 12 of a motor vehicle 14. As illustrated, the self-cleaning system 10 includes a photoactive self-cleaning surface 16 in the interior 12 of the motor vehicle 14. That photoactive self-cleaning surface 16 incorporates a photoactive self-cleaning agent such as titanium dioxide. The photoactive self-cleaning agent/titanium dioxide may be applied to various vehicle interior surfaces by spraying post-fabrication or may be incorporated into the finishes and materials used to fabricate the various surfaces. Seat fabrics and leathers, door panel coverings, molded plastic surfaces, carpeting, instrument panel and console surfaces, steering wheel and shifter materials and coverings as well as control knobs and switches may be treated. Accordingly, the photoactive self-cleaning surface 16 may be selected from a group of surfaces consisting of a seat surface, a trim panel surface, a console surface, a steering wheel surface, a shifter surface, a switch gear surface, an instrument panel surface, a dashboard surface, a seatbelt assembly surface, a flooring surface, a molded plastic surface and any combinations thereof.

Figure 1:
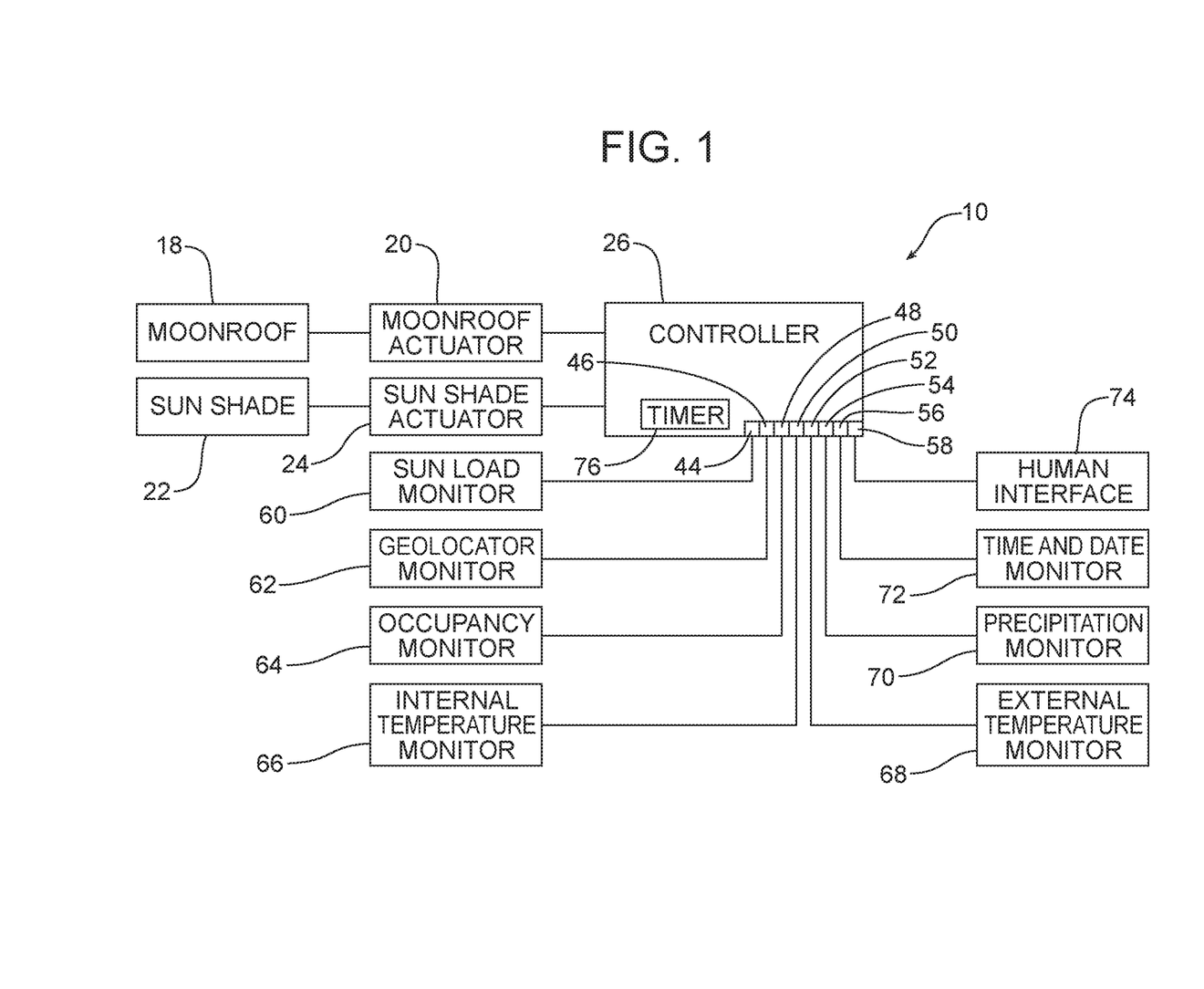
FIG. 1 is a schematic block diagram of the self-cleaning system.
Figure 2:
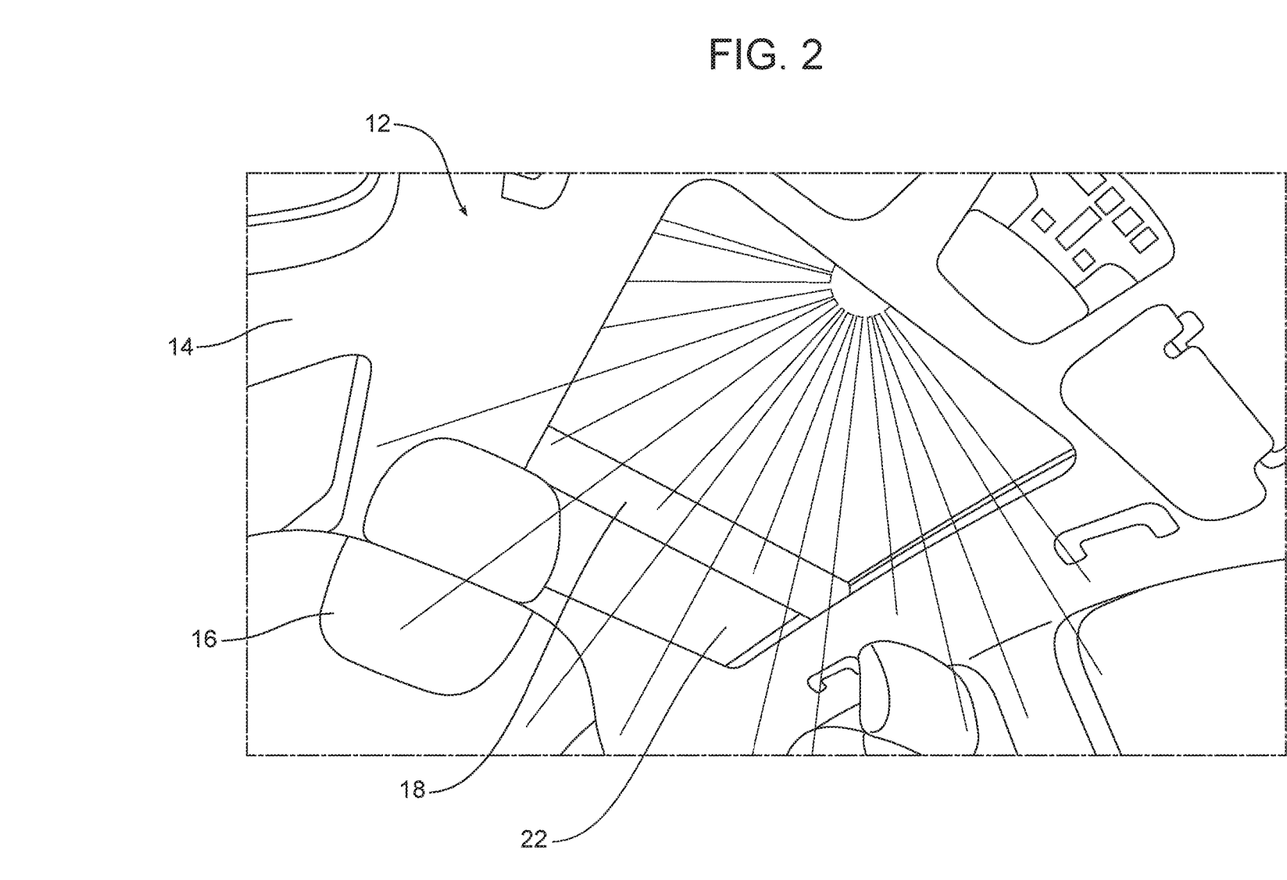
FIG. 2 is a perspective view of the interior of a motor vehicle looking upward through an open moon roof.
Figure 3:
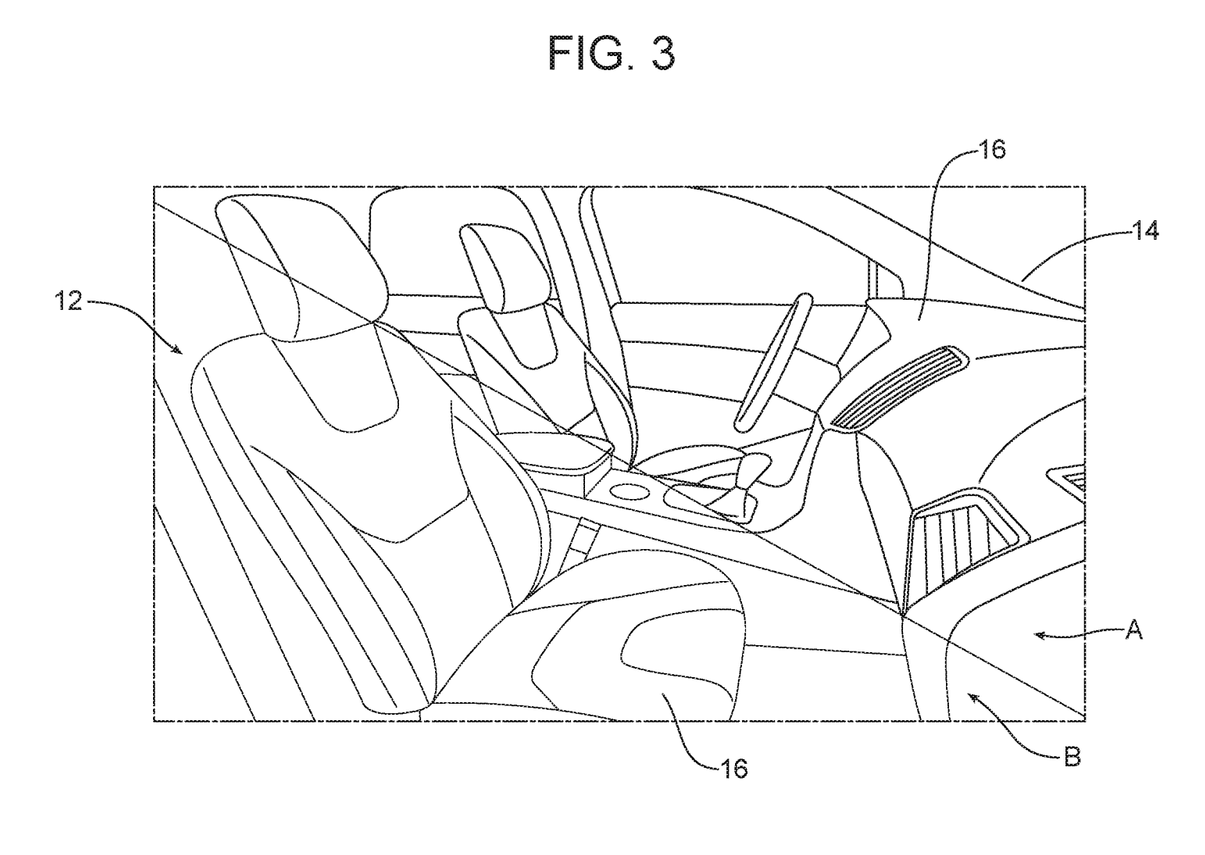
FIG. 3 is a perspective view of the interior of the motor vehicle showing how a portion of the motor vehicle is being subjected to direct sunlight to provide for self-cleaning of that portion of the motor vehicle interior while the other portion of the motor vehicle interior is in shade.

The self-cleaning system 10 also includes a moon roof 18 as well as a moon roof actuator 20 for opening and closing the moon roof. Further, the self-cleaning system 10 includes a sun shade 22 and a sun shade actuator 24 for opening and closing the sun shade and thereby controlling the passage of sunlight into the interior 12 of the motor vehicle 14. Significantly, sunlight is one of the strongest and lowest cost UV light sources. By providing independent control of the positioning of the moon roof 18 and the cooperating sun shade 22, it is possible to selectively clean specific areas of the interior 12 of the motor vehicle 14 by allowing the sunlight to impinge upon the photoactive self-cleaning surfaces 16 in those areas for a given period of treatment time by opening and closing the sun shade 22. It is also possible to provide some control of the interior temperature of the motor vehicle 14 when sanitizing the interior surfaces 16 of the motor vehicle 14 by opening and closing the moon roof 18 to provide ventilation.

Toward this end, the self-cleaning system 10 is made intelligent by including a controller 26 configured to independently control the operation of the moon roof actuator 20 and the sun shade actuator 24 and thereby independently control the displacement or opening and closing of the moon roof 18 and the sun shade 22.

Figure 1A:
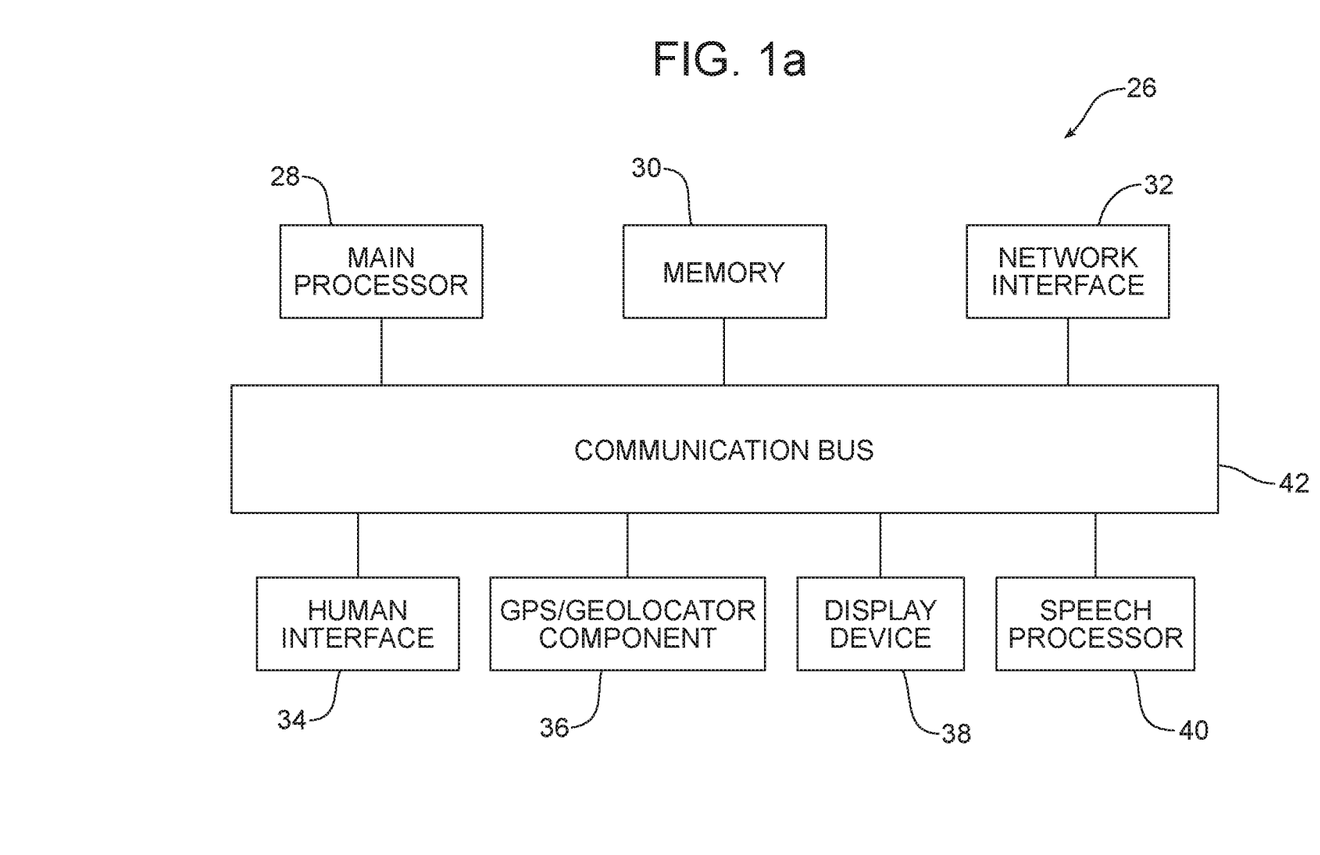
FIG. 1a is a schematic block diagram of one possible embodiment of the controller for the self-cleaning system illustrated in FIG. 1.

The controller 26 may comprise a computing device such as a dedicated microprocessor or electronic control unit (ECU) operating in accordance with instructions from appropriate control software. In one of the many possible embodiments, the controller 26 may comprise a body control module (BCM) controller. As illustrated in FIG. 1a, a BCM controller 26 comprises a computing device having one or more processors 28, one or more memories 30, one or more network interfaces 32, a human interface 34, a GPS/geolocator component 36, a display device such as a multi-function display with touchscreen capability 38 and a speech processor 40 for voice command control that all communicate with each other over a communication bus 42. The BCM controller 26 performs a number of interior body electrically based functions including, for example, interior locking, remote key entry, interior lighting, exterior lighting, windshield wiper control and the like. In some embodiments, the BCM controller 26 may also function to control entertainment functions (e.g. radio, CD player) and communications such as telephone and internet communications over a wireless network. In some embodiments the BCM controller 26 is connected by a communication bus (not shown) to other control modules that provide one or more of these additional functions.

As should be appreciated from this description, the controller 26 is configured to open the sun shade 22 when sunlight will impinge upon the photoactive self-cleaning system 16 and promote cleaning of that surface. Significantly, as will become apparent from the following description, the controller 26 will include various data inputs that will allow the controller to open the sun shade 22 to illuminate various sections or areas of the motor vehicle interior 12 based on the direction the vehicle is facing when parked, the latitude of the vehicle's location, the date and time of day, the intensity of the sun and the like. The controller 26 also includes data inputs allowing it to measure passive solar heating and may control the opening and closing of the moon roof 18 as well to help control the interior temperature in cool or warm ambient conditions. This is a particularly useful performance feature for battery powered motor vehicles 14 as electric energy used for heating and cooling reduces the driving range of such vehicles.

Toward this end, in the illustrated embodiment, the controller 26 includes a first data input 44, a second data input 46, a third data input 48, a fourth data input 50, a fifth data input 52, a sixth data input 54, a seventh data input 56 and an eighth data input 58.

The first data input 44 is connected to a sun load monitor 60. The second data input 46 is connected to a geolocator monitor 62 in an embodiment where a GPS/geolocator component 36 is not already incorporated into the controller 26.

The third data input 48 is connected to an occupancy monitor 64 such as generally provided in motor vehicles as a part of the seat belt monitoring system. The fourth data input 50 is connected to an internal temperature monitor 66 that monitors the internal temperature of the interior 12 of the motor vehicle 14.

The fifth data input 52 is connected to an exterior temperature monitor 68 for monitoring the ambient temperature. The sixth data input 54 is connected to a current precipitation monitor 70 such as utilized to control automatic windshield wiper systems of many current motor vehicles. The seventh data input 56 is connected to a time and date monitor 72 which provides current date and time data. The eighth data input 58 is connected to a human interface 74 where the controller 26 does not incorporate a human interface such as provided at 34 in FIG. 1a.

As also illustrated in FIG. 1, the controller 26 may be configured to include a timer 76 that provides a timer function allowing timing of each cleaning cycle as well as the time between cleaning cycles including even for specific areas or surfaces of the interior of the motor vehicle as will become apparent from the following description.

The controller 26 utilizes GPS/geolocator data from the GPS/geolocator component 36 or the geolocator monitor 62 in order to determine the current position and orientation of the motor vehicle in conjunction with time and date data from the time and date monitor 72 to establish the position of the sun with respect to the motor vehicle.

The controller 26 also responds to sun load data from the sun load monitor 60. All this data allows the controller 26 to determine if sufficient sunlight is present for initiating a cleaning cycle as well as what area or areas/self-cleaning surfaces 16 of the interior 12 of the motor vehicle will be impinged upon by that sunlight during the cleaning cycle. The timer 76 functions to ensure that the sun shade 22 is maintained open and sunlight impinges on the particular self-cleaning surfaces 16 of the motor vehicle for the necessary time to provide for proper cleaning/sanitation. At the end of the cleaning cycle, the sun shade 22 may be closed if desired or returned to a set predetermined position as input by the motor vehicle operator through the human interface 34, the touchscreen display device 38 or via the speech processor 40 through voice command.

During the cleaning cycle, the controller 26 is able to monitor the interior temperature of the motor vehicle through the monitor 66 and the exterior ambient temperature through the monitor 68. In warm summer months, the interior 12 of the motor vehicle 14 may become excessively hot through solar heating during the cleaning cycle and the controller 26 may respond by opening the moon roof 18 to provide for ventilation and better temperature control. In the event of a sudden cloud burst or detection of precipitation including water spray from a nearby sprinkler system, as indicated by data from the current precipitation monitor 70, the controller responds by closing the moon roof 18.

As should be appreciated, in order for the self-cleaning system 10 to be effective, the transparent moon roof 18 should not include a UV blocker or shading. Alternatively, the moon roof 18 may be modified to only pass visible light and near UV or UVA needed for activating the photoactive self-cleaning surface 16 and infrared light for interior solar heating during cold weather conditions.

Consistent with the above description, a method is provided of cleaning a self-cleaning surface 16 in a passenger compartment or interior 12 of a motor vehicle 14. That method comprises providing a photoactive self-cleaning agent such as titanium dioxide on the surface 16 and opening, by the controller 26, the sun shade 22 of the motor vehicle to allow sunlight to impinge upon and promote cleaning of the self-cleaning surface.

As previously noted, the method includes configuring the controller 26 to respond to various data inputs including, but not necessarily limited to geolocator data, sun load data, occupancy data, time data, passenger compartment or interior temperature data, exterior ambient temperature data, current precipitation data and the like. Further, the controller 26 may be configured to include a timer 76 to time each cleaning cycle as well as the time between cleaning cycles including even for specific areas or photoactive self-cleaning surfaces 16 of the motor vehicle as determined by sun load, geolocator, and time data.

Figure 4A:
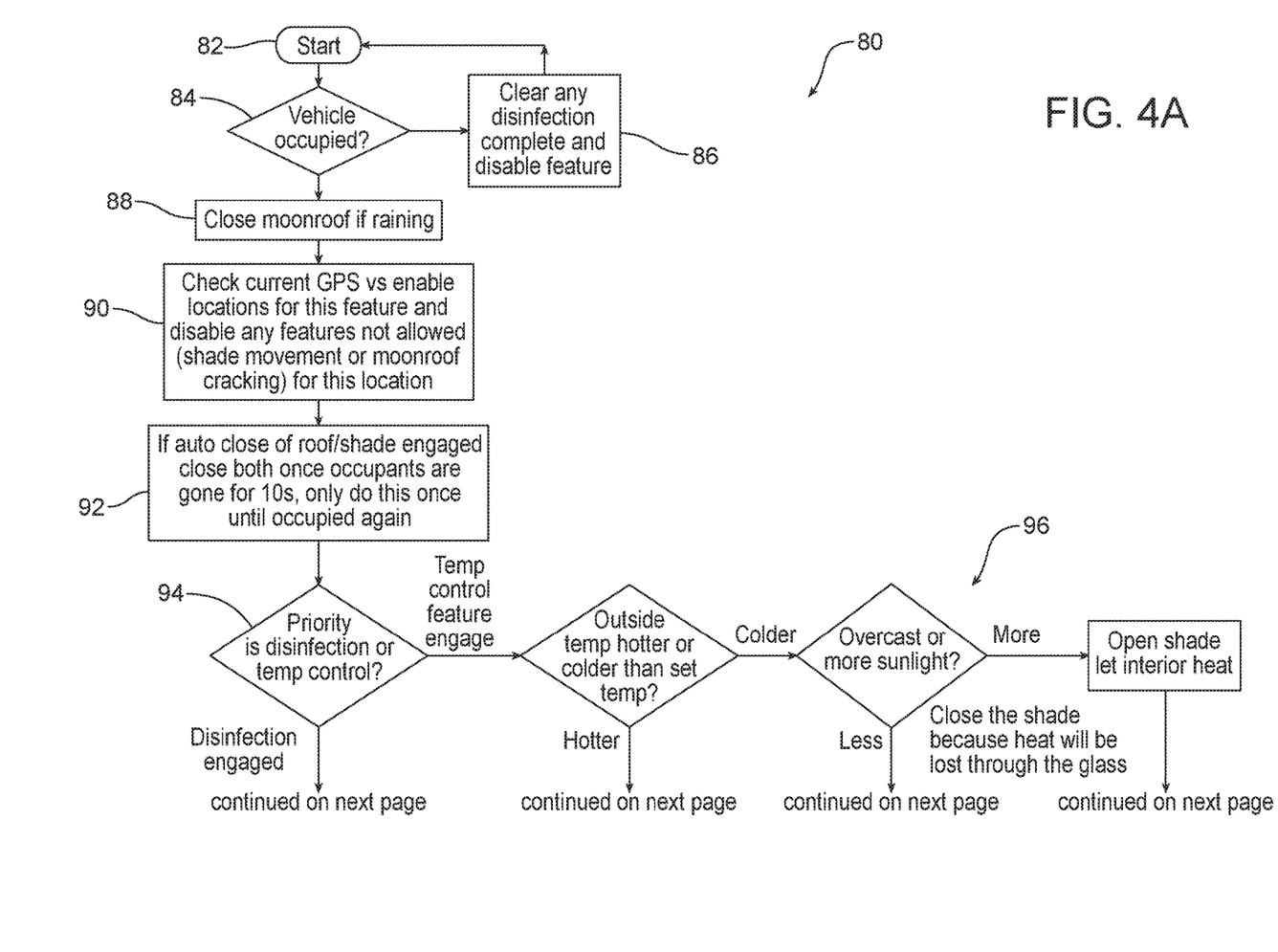
FIGS. 4A and 4B illustrate a control logic flow diagram for one of the many possible embodiments of the self-cleaning system.
Figure 4B:
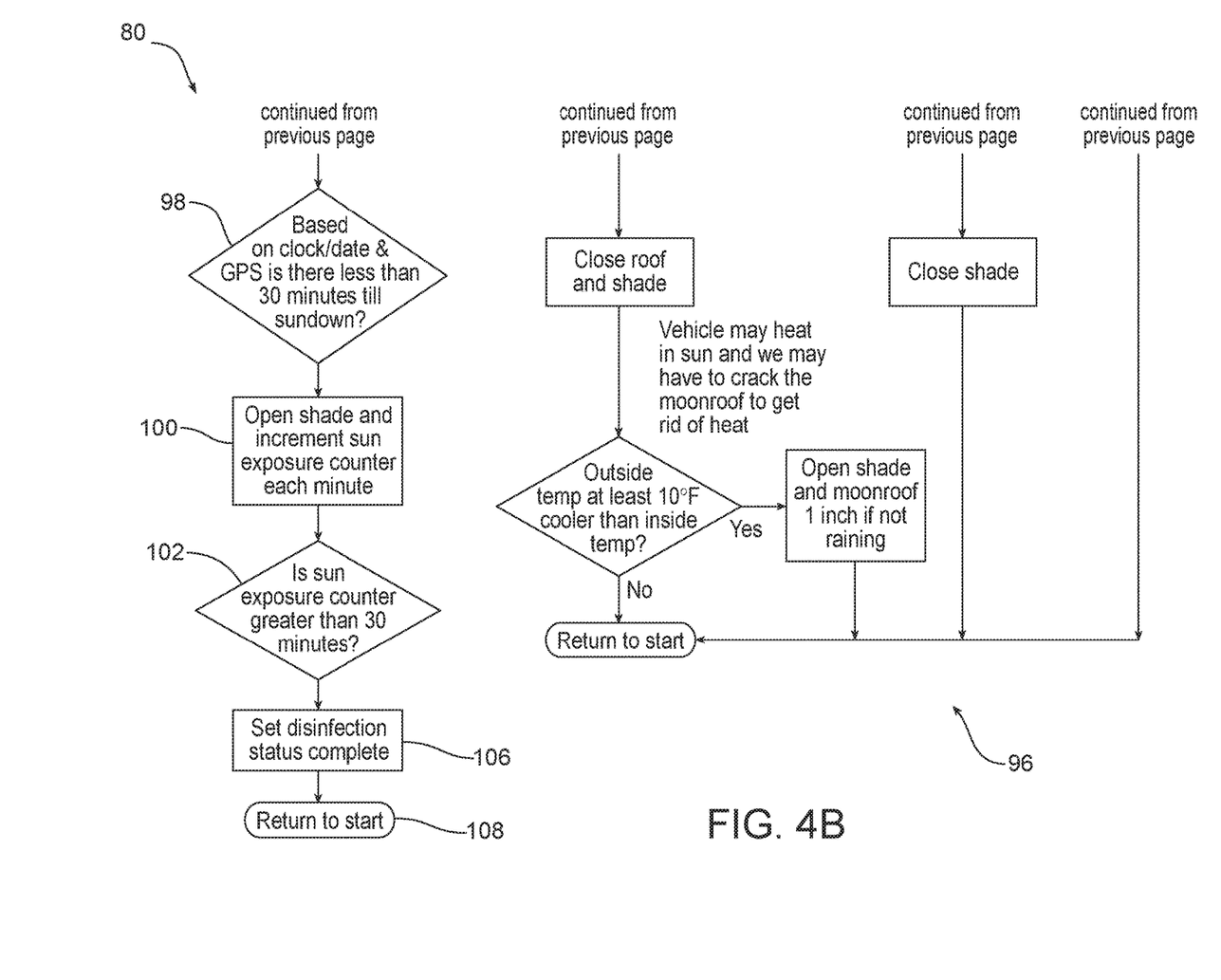

Reference is now made to FIGS. 4A and 4B illustrating one possible control logic flow diagram for the self-cleaning system 10. The control logic flow diagram 80 begins at start box 82. Next, the controller 26 queries if the vehicle is occupied at box 84. If the vehicle is occupied based upon, for example, occupancy data provided by the occupancy monitor 64 at the third data input 48, the controller 26 clears any disinfection complete and disables the feature (box 86).

If the vehicle is unoccupied, the controller 26 closes the moon roof 18 if the current precipitation monitor 70 provides data indicating current precipitation at the sixth data input 54 (see box 88). Next, the controller checks current GPS versus enabled locations for activating the self-cleaning system 10 and disables any features not allowed such as shade movement or moon roof cracking for the indicated location (see box 90). Next, the controller 26 queries if the auto close of the roof/shade is engaged and both the moon roof 18 and sun shade 22 are closed once the occupants are gone for 10 seconds (see box 92).

Next, the controller 26 queries (see box 94) if the operating priority desired by the operator is disinfection of the self-cleaning surfaces 16 in the interior 12 of the motor vehicle 14 or interior temperature control. If interior temperature control is the priority, the controller 26 is guided by the various control logic boxes of the interior temperature control loop 96 which are self-explanatory and are not discussed in greater detail in this text. The interior temperature control feature embodied in the interior temperature control loop 96 may be engaged independent of the cleaning feature if desired.

In contrast, if priority is disinfection of the self-cleaning surfaces 16 within the interior 12 of the motor vehicle 14, the controller 26 (see box 98) utilizes time and date data from the time and date monitor 72 provided at the seventh data input 56 and GPS/geolocator data from the GPS/geolocator component 36 or the separate geolocator monitor 62 to determine the orientation of the motor vehicle, the position of the sun with respect to the motor vehicle and the time until sundown. Depending on the indicated data, the controller 26 will know what area of the interior of the motor vehicle and, more particularly, what self-cleaning surfaces 16 will be subjected to sunlight and cleaning.

The controller 26 then queries respecting the current sun load, determined via data received at the data input 44 from the sun load monitor 60, and sets the sun exposure counter based upon the intensity of the sun load (see box 100). As illustrated in FIG. 2, the controller 26 then opens the sun shade 22 (see box 102) to allow the passage of sunlight into the interior 12 of the motor vehicle and the moon roof 18 to allow for ventilation to limit the solar heating of the interior 12 of the motor vehicle 14 (if appropriate based upon interior and ambient temperatures as determined by the monitors 66, 68 and indicated at data inputs 50, 52. As illustrated in FIG. 3, depending on the position of the sun, the sun may only impinge upon and clean a certain area of the interior of the motor vehicle indicated at A while the second area B remains in the shade and is not subjected to cleaning. The controller 26 stores this data and is able to keep track of which areas of the interior 12 and which self-cleaning surfaces 16 in those areas have been subjected to cleaning and which have not. The controller 26 also increments the sun exposure counter for each predetermined interval, such as each minute.

The controller 26 then utilizes the timer 76 to determine if the sun exposure counter is greater than the desired sanitation time which in the illustrated embodiment is 30 minutes (see box 104). Once that time has been met, the controller 26 sets the disinfection status as complete (see box 106) before returning to the start (see box 108).

In summary, the self-cleaning system 10 provides a number of benefits and advantages. The self-cleaning system 10 may be programmed through, for example, the human interface 34, the touchscreen display device 38 or the speech processor 40 via voice command to automatically open and close the sun shade 22 as necessary when the vehicle is unoccupied and then return the sun shade to the owner-preferred position when the cleaning cycle is complete or even when the driver approaches the motor vehicle 14 through detection of driver presence via key fob or other device. The controller 26 may be programmed to open the sun shade 22 in bright sunlight using the various inputs for a selected duration of cleaning cycle time to allow the self-cleaning surface 16 within the interior 12 of the motor vehicle 14 to be sufficiently irradiated with UV light from the sun to effectively activate the photoactive agent in the self-cleaning surface 16.

Advantageously, the controller 26 may utilize GPS data and time data to determine the parked vehicle direction, and the sun direction and thereby open the sun shade 22 to expose a particular area/self-cleaning surface 16 of the interior 12 of the motor vehicle 14 to sunlight. This may be done for a sufficient period of time as measured by the timer 76 to effectively activate the photoactive agent in the self-cleaning surface 16 to provide effective sanitation of that surface. Since the motor vehicle is parked in different directions at different times of the day and on different days, the various self-cleaning surfaces 16 in the various areas of the interior 12 of the motor vehicle may be activated and cleaned.

The controller 26 also has the capability to close the sun shade 22 in summer sun to help reduce heating of the interior 12 as determined utilizing data from the interior and exterior temperature monitors 66, 68. Similarly, the controller 26 may open the sun shade on sunny days in the winter to increase solar heating of the interior 12 of the motor vehicle.

The vehicle operator has access via, for example, the touchscreen display device 38 or the speech processor 40 via voice command to control what position is preferred for the sun shade 22 when not controlling the shade during a cleaning cycle or for temperature control. Thus, for example, if the motor vehicle operator prefers, the sun shade 22 may be closed at all other times for security purposes. Using the GPS locator data, it is possible for the vehicle operator to provide different preferences for the controller 26 to follow for different geographic areas or locations. Thus, for example, the controller 26 may be set to only activate the self-cleaning system 10 when the motor vehicle is sitting in an exterior location at the home of the operator or in a parking lot at the operator's work.

Additionally, the controller 26 may be programmed to allow the motor vehicle operator to close the moon roof 18 and/or the sun shade 22 at any time via key fob, cell phone control via app or other methods.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A self-cleaning system for an interior of a motor vehicle, comprising:
   a photoactive self-cleaning surface;
   a sun shade;
   a sun shade actuator displacing said sun shade between a first opened position and a first closed position; and
   a controller configured to open said sun shade when sunlight is directed so as to impinge upon said photoactive self-cleaning surface and promote cleaning.

2. The self-cleaning system of claim 1, wherein said controller is configured to respond to sun load data.

3. The self-cleaning system of claim 2, wherein said controller is configured to respond to geolocator data for said motor vehicle.

4. The self-cleaning system of claim 3, wherein said controller is configured to respond to motor vehicle occupancy data.

5. The self-cleaning system of claim 4, wherein said controller is configured to respond to time data.

6. The self-cleaning system of claim 5, further including a moon roof and a moon roof actuator displacing said moon roof between a second opened position and a second closed position after the sun shade has been displaced.

7. The self-cleaning system of claim 6, wherein said controller is configured to respond to internal temperature data.

8. The self-cleaning system of claim 7, wherein said controller is configured to respond to ambient temperature data.

9. The self-cleaning system of claim 8, wherein said controller is configured to respond to current precipitation data.

10. The self-cleaning system of claim 9, wherein said photoactive self-cleaning surface is selected from a group of surfaces consisting of a seat surface, a trim panel surface, a console surface, a steering wheel surface, a shifter surface, a switch gear surface, an instrument panel surface, a dashboard surface, a seatbelt assembly surface, a flooring surface, a molded plastic surface and combinations thereof.

11. The self-cleaning system of claim 10, wherein said photoactive self-cleaning surface includes titanium dioxide.

12. The self-cleaning system of claim 11, wherein said controller is configured with a timer function.

13. A method of self-cleaning a surface in a passenger compartment of a motor vehicle, comprising:
    providing a photoactive self-cleaning agent on said surface; and
    opening, by a controller, a sun shade of said motor vehicle to allow sunlight to impinge upon said surface thereby activating said self-cleaning agent.

14. The method of claim 13, including configuring said controller to respond to geolocator data.

15. The method of claim 13, including configuring said controller to respond to sun load data.

16. The method of claim 13, including configuring said controller to respond to motor vehicle occupancy data.

17. The method of claim 13, including configuring said controller to respond to time data.

18. The method of claim 17, including configuring said controller to include a timer and closing, by said controller, said sun shade after a predetermined period of time.

19. The method of claim 13, including after opening said sun shade opening and closing a moon roof of said motor vehicle, by said controller, in response to passenger compartment temperature data and ambient temperature data.

20. The method of claim 19, including closing said moon roof, by said controller, in response to current precipitation data.

* * * * *